Patented Dec. 31, 1946

2,413,361

UNITED STATES PATENT OFFICE 2,413,361

MANUFACTURE OF THIO-ACIDS AND DERIVATIVES

Harry M. Martin, New York, N. Y., assignor to Martin Laboratories, Inc., New York, N. Y., a corporation of New York No Drawing. Application March 2, 1945,
Serial No. 580,721

5 Claims. (Cl. 260—526)

The invention is for producing thio-acids and derivatives, and particularly thioglycolic acid, dithiodiglycolic acid and their congeners, herein referred to generally as thioglycolics, and the invention consists in the discovery that such products can be practically and commercially produced directly from sodium thiosulfate, which is a commercial commodity, both abundant and cheap, sometimes called photographers' hypo.

According to this invention sodium thiosulfate is first raised to an elevated temperature and thereby melted and then reacted directly with a mono-halogen organic acid, preferably also heated, and more particularly with a fatty acid, mono-chloracetic acid being preferred. On hydrolysis of the product of this reaction thio products are produced which can be readily extracted from the reaction mass, either before or after modification. Contrary to expectation the reaction proceeds without incurring any substantial loss by precipitation of elemental sulfur.

Following is an exemplification of the new process as applied to the manufacture of thioglycolic acid:

Four hundred pounds of 95% mono-chloracetic acid are mixed with about 6000 pounds of water in a suitable receptacle, large enough to accommodate some foaming. The mixture is desirably raised to a temperature above 20° C., say to between 45° and 80° C.

In a separate receptacle 10,000 pounds of commercial sodium thiosulfate crystals $$(NA_2S_2O_35H_2O)$$

are heated and melted, and stirred the meantime. The heat is conveniently applied to the crystals by the direct injection of steam into the receptacle, in which case the resulting water of condensation aids in the liquefaction. The preheating is essential and raises the temperature of the thio-sulfate through its melting point (48° C.), and preferably to a point between 70° and 110° C. It is found that temperatures higher than 70° C. give practically no loss by sulfur precipitation and therefore better yields of thio products.

The chloracetic acid and the melted sodium thiosulfate are then brought together at their elevated temperatures as by slowly pouring the latter into the former while intimately mixing them by continuous agitation. Slow pouring and good mixing are desirable, not only because they restrain foaming, but because this practice also restrains sulfur precipitation. The pouring should take at least 10 minutes for the case being described.

The reaction develops gases, $SO_2$ and $HCl$, also heat, and the temperature is maintained by applying more heat as necessary to keep the batch up to about 85° or 95° C., during the progress of the reaction. If this is done by steam injection, which is preferred, the steam aids in purging the batch of the gases. The accretion of water due to this method of heating can of course be taken into account in preparing for the process to avoid an excess of water diluent requiring to be handled later.

When the reaction has proceeded so far that samples tested from time to time indicate no precipitation of sulfur by sulfuric acid, 200 gallons of sulfuric acid, 60° B. are added, and the heating or steam injection is continued for 3½ to 4 hours. This is the hydrolysis step and results in the formation of thioglycolic acid and some dithiodiglycolic acid in varying relative proportions. They can be recovered from the batch and then separated from each other if desired, but preferably the dithiodiglycolic portion is converted to thioglycolic acid without removal by introducing or applying some appropriate reducing agent, as metallic zinc, aluminum, magnesium or electrolysis.

Ordinarily zinc dust is added, equal to about one-half the weight of the halogen acid, as soon as it has been determined by sampling that the maximum proportion of the mono-form acid has been developed. The zinc is slowly stirred into the batch, and when the reduction has been completed the batch is allowed to stand while cooling and settling. Thereafter the thio content or thioglycolic acid is removed by extraction with isopropyl ether or in any other convenient manner, not necessary to be here described. Yields of 85% of theoretical, or higher, based on the weight of the halogen acid, are to be expected and with but insignificant (5%) loss of sulfur by precipitation if the process is conducted with care.

Other thioglycolics are obtainable by simple modification or extension of the above operation, for instance alkyl thioglycolates. They can be obtained by adding to the batch, either before or after the reduction of the di-form, an alcohol, such as methanol, ethanol, hexanol, 2,6-dimethyl-octanol, etc., the resulting alkyl thioglycolates being easily recovered by extraction. Other organic halogen acids function similarly to the chloracetic acid, and can be used to produce corresponding thio-acid products without excessive loss of sulfur and therefore with like manufacturing economy. For example, an equivalent amount of (alpha) chlorpropionic acid can be substituted for the chloracetic acid to produce thiolactic acid and dithiodilactic acid (which latter can be converted to thiolactic acid in the same manner as above described), and so as to give a good total yield of thiolactic acid.

Also, chlorsuccinic acid has been reacted with the melted sodium thiosulfate to yield on the same economical basis thiomalic (mercapto succinic acid), and alpha chlorphenyl acetic acid to yield phenyl-thioglycolic acid.

I claim:

1. In the process of producing alpha-mercaptocarboxylic acids selected from the class consisting of alkyl and phenalkyl carboxylic acids the improvements comprising diluting an alpha-chlorcarboxylic acid selected from the class consisting of alkyl and phenalkyl carboxylic acids with water in a reaction vessel, preheating said diluted acid to a temperature between about 45 and 80° C., adding to said diluted acid during continuous agitation fused sodium thiosulfate preheated to a temperature between about 70 and 110° C., maintaining the foregoing reaction mixture at a temperature of about 85 to 95° C. until the reaction is substantially completed, then adding sulfuric acid to the reaction mixture in said vessel while maintaining said temperature of 85 to 95° C., thereby hydrolyzing the product formed from said acid and said sodium thiosulfate to a mixture of the mono- and di-forms of alpha-mercaptocarboxylic acids selected from the class consisting of alkyl and phenalkyl carboxylic acids, and adding a metallic reducing agent to said reaction vessel to convert said di-acid to said mono-acid, and thereafter extracting said mono-acid from the contents of said reaction vessel.

2. In the process of producing alpha-mercaptocarboxylic acids selected from the class consisting of alkyl and phenalkyl carboxylic acids the improvements comprising diluting an alpha halogen carboxylic acid selected from the class consisting of alkyl and phenalkyl carboxylic acids with water in a reaction vessel, preheating said diluted acid to a temperature between about 45 and 80° C., adding to said diluted acid during continuous agitation fused sodium thiosulfate preheated to a temperature between about 70 and 110° C., maintaining the foregoing reaction mixture at reaction temperature until the reaction is substantially completed, and then adding a mineral acid to the reaction mixture in said vessel, thereby hydrolyzing the product formed from said acid and said sodium thiosulfate to a mixture of mono- and di-alpha-mercaptocarboxylic acids selected from the class consisting of alkyl and phenalkyl carboxylic acids, and adding a metallic reducing agent to said reaction vessel to convert said di-acid to said mono-acid.

3. Process according to claim 1 in which the acid reacted with the sodium thiosulfate is alpha-chloracetic acid.

4. Process according to claim 1 in which the acid reacted with the sodium thiosulfate is alpha-chlorpropionic acid.

5. Process according to claim 1 in which the acid reacted with the sodium thiosulfate is alpha-chlorphenacetic acid.

HARRY M. MARTIN.